United States Patent
Niva

(10) Patent No.: US 8,684,125 B2
(45) Date of Patent: Apr. 1, 2014

(54) LOAD-CARRYING VEHICLE

(75) Inventor: Karl-Erik Niva, Kiruna (SE)

(73) Assignee: Atlas Copco Rock Drills AB, Orebro (SE)

( * ) Notice: Subject to any disclaimer, the term of this patent is extended or adjusted under 35 U.S.C. 154(b) by 46 days.

(21) Appl. No.: 13/261,292

(22) PCT Filed: Nov. 10, 2010

(86) PCT No.: PCT/SE2010/051231
§ 371 (c)(1),
(2), (4) Date: May 15, 2012

(87) PCT Pub. No.: WO2011/062545
PCT Pub. Date: May 26, 2011

(65) Prior Publication Data
US 2012/0241229 A1 Sep. 27, 2012

(30) Foreign Application Priority Data
Nov. 17, 2009 (SE) ...................................... 0901458

(51) Int. Cl.
*B60K 17/34* (2006.01)

(52) U.S. Cl.
USPC ........................... 180/235; 180/6.64; 180/418

(58) Field of Classification Search
USPC ................................. 180/6.64, 235, 418, 419
See application file for complete search history.

(56) References Cited

U.S. PATENT DOCUMENTS

| | | | |
|---|---|---|---|
| 2,140,109 A | 12/1938 | Kellar | |
| 4,010,816 A | 3/1977 | Powell | |
| 4,202,453 A * | 5/1980 | Wilkes et al. | 212/290 |
| 4,625,821 A | 12/1986 | Aumont et al. | |
| 5,899,292 A | 5/1999 | Paul et al. | |
| 6,299,181 B1 | 10/2001 | Ericksson | |
| 6,306,056 B1 | 10/2001 | Moore | |
| 6,691,805 B2 | 2/2004 | Thaemlitz | |
| 6,789,639 B2 | 9/2004 | Uranaka et al. | |
| 7,147,070 B2 | 12/2006 | Leclerc | |
| 7,147,073 B2 | 12/2006 | Mollhagen | |
| 7,152,705 B2 | 12/2006 | Alster et al. | |
| 2002/0175009 A1 | 11/2002 | Kress | |
| 2006/0191168 A1 | 8/2006 | Casey et al. | |

FOREIGN PATENT DOCUMENTS

| | | |
|---|---|---|
| DE | 10005527 | 8/2001 |
| EP | 1918180 | 5/2008 |
| SE | 465771 | 10/1928 |
| SE | 509847 | 3/1999 |
| WO | WO 9109765 | 7/1991 |
| WO | WO 2009108089 | 9/2009 |
| WO | WO 2009108104 | 9/2009 |

\* cited by examiner

*Primary Examiner* — Kevin Hurley
*Assistant Examiner* — Marc A Scharich
(74) *Attorney, Agent, or Firm* — Mark P. Stone

(57) ABSTRACT

An articulated steering load-carrying vehicle (1) with a front portion (2), which by a steering joint (10) is connected to a rear portion (3), and in which the front portion (2) includes a first power engine (12) and at least one forward driven wheel pair (5, 5'), and in which, the rear portion (3) includes a load receiving device (6) and at least two driven wheel pairs (7, 7'; 8, 8'). A second wheel pair (8, 8') of the at least two driven wheel pairs (7, 7'; 8, 8') on the rear portion a second wheel pair (8, 8') is steeringly connected to the rear portion. A system for driving of such a load-carrying vehicle is also provided.

19 Claims, 2 Drawing Sheets

LOAD-CARRYING VEHICLE

FIELD OF THE INVENTION

The invention concerns an articulated steering load-carrying vehicle with a front portion, which over a steering joint is connected to a rear portion, wherein the front portion includes a first power engine and at least one forward driven wheel pair arranged on a front wheel shaft, and wherein the rear portion includes a load receiving device and at least two driven wheel pairs including a first wheel pair being arranged on a first wheel shaft and a second wheel pair arranged on a second wheel shaft.

BACKGROUND OF THE INVENTION

Such an articulated steering load-carrying vehicle is previously known from WO2009/108089 A1. This document relates to an articulated steering load-carrying vehicle of hybrid type, wherein a front mounted combustion engine over a generator powers a front wheel pair as well as two driven wheel pairs arranged on the rear portion, wherein these two wheel pairs are arranged in a bogie configuration.

Through this construction the previously known vehicle on the one hand has a greater load-carrying ability, on the other hand enhanced propulsive ability in relation to an articulated steering load-carrying vehicle with one driven front wheel pair and with only one driven wheel pair on the rear portion.

The load-carrying vehicle according to WO2009/108089 A1 is, however, limited in respect of use and driveability.

As examples of background art for increasing transport speed during driving uphill with high load are: increased power in the driving system, i.e. increased engine power, increased capacity of the transmission and driveline. The previously known solutions give, however, increased vehicle dimensions and in particular wheel dimensions. Besides additional costs for driving gear as well as chassis construction of the vehicle and wheel costs, hereby the need increases for increased dimensions of tunnels, wherein a vehicle is to be driven, with all the economic consequences this results in, such as requirements of increased costs for tunnel driving.

SE 465 771, DE 10005527 and SE 509 847 are further examples of documents representing the background art.

Aim and Most Important Features of the Invention

An aim of the present invention is to provide an economically producible articulated steering load-carrying vehicle of the kind indicated above, which allows good driveability and flexibility during high loading capacity.

This aim is obtained in a load-carrying vehicle as above in that the second wheel pair normally being positioned most rearwardly on the rear portion being steeringly connected to the rear portion seen in regard of steering, that the second wheel pair is electrically motor driven over electrical motor means, that a second power engine is arranged to power supply said electric motor means over an electric generator, and that the second power engine and the associated electric generator are arranged in the rear portion. With "as regards steering" is herein intended steering for the purpose of turning of the vehicle.

Hereby great advantages are obtained in particular for an articulated steering load-carrying vehicle intended for use in mines below ground, when it is very important to be able to drive as smoothly as possible with a load-carrying vehicle with as high load capacity as possible in as narrow tunnels and galleries as possible.

In particular, the invention is advantageous for driving uphill, since a vehicle according to the invention can be driven in steeper uphill slopes. This results in that tunnels can be planed with a higher degree of inclination, which is a great economic advantage, since hereby totally shorter tunnels can be planed for a mine or an underground building project.

During mining, tunnel driving for transport tunnels is a necessary evil, as seen economically, to the extent that there is a desire to have as short tunnels with as narrow dimensions as possible in order to avoid the costs brought about for driving and scaling out and reinforcing tunnels of greater dimensions. The smaller dimensions of the tunnels, the lower the extraction costs for material obtained in the mine. For that reason there is an aim to provide longer vehicles, that have good drivability and in particular ability of be driven in curves in tunnels having as small dimensions as possible. When providing longer load-carrying vehicles, there are, however, problems with dimensions of everything from wheel to driving engine.

By providing two driven wheel pairs on the rear portion, wherein a second wheel pair is also, in regard to steering, steeringly connected to the rear portion, the wheels can be used more optimally and wear because of skidding tires on bogies not being steered can be avoided, problems that the vehicle according to WO2009/108089 A1 suffers from. With "skidding tires" is here intended tires that are not rolling ideally against the ground because of its wheel axis not being directed against the turning centre of the vehicle, and which therefore experience a certain "skidding" against the ground also during normal turning. The working life of the load-carrying vehicle as well as in particular the tires can thereby be considerably extended in regard of a vehicle according to the invention.

By further a second power engine being arranged over an electric generator to power supply the electric motor means which drives the wheels of the second wheel pair, the load capacity and the transport speed in uphill slopes can be considerably enhanced in spaces were width and height of the tunnel are limited in that the first driving motor and associated driveline components do not have to be dimensioned for powering the wheels in this second wheel pair. Hereby the ratio between loading capacity and tire dimension of the vehicle is enhanced and the space requirements are reduced.

By the second power engine and the associated electric generator being arranged in the rear portion, advantages are obtained as regards installation and space.

Said second power engine can be arranged to be engaged as required such as when driving with load uphill, wherein in such cases all wheel pairs of the vehicle are driven. During drive modes where the power requirement is less, the second power engine can be disconnected and propulsion take place over the first power engine which is the main engine of the vehicle.

In a particular aspect, the first wheel pair is electrically driven over further electric motor means, wherein a further power engine is arranged to power supply said further electric motor means over a further electric generator. Hereby the mechanical drive transmission between the parts of the vehicle can be avoided.

It is preferred that also said further power engine and associated electric generator are arranged in the rear portion, since also this arrangement results in an advantage as regards installation and space.

The first power engine is preferably over a drive shaft and a transmission arranged, over a drive shaft, to mechanically drive the front wheel shaft, which carries the front wheel pair. Further, according to a second aspect, the first power engine is, over the drive shaft and the transmission, arranged to mechanically over a drive shaft drive the first wheel shaft in the rear portion, said first wheel shaft thus carrying the first wheel pair.

Suitably, the front wheel pair is arranged on a rigid front wheel axis and a first driven wheel pair on a rigid first wheel axis, wherein of said at least two driven wheel pairs on the rear portion, the first wheel pair being arranged closest to the steering joint being rigidly connected to the rear portion.

By the first wheel shaft being interconnected with a second shaft carrying the second driven wheel pair over a pendulum suspension device, a bogie arrangement is formed and good drivability on uneven surfaces obtained.

The vehicle according to the invention usually provides a driver's cabin but can also be remote controlled.

Through the invention, a high degree of modularity is made possible, which means that in a conventionally built articulated steering load-carrying vehicle having two wheel pairs, the ordinary engine and the ordinary driveline can be maintained. An auxiliary module being comprised of, as an example, in its simplest form, a unit including driving arrangements for the second wheel pair with appropriate adjustment parts can hereby be provided as required for increased capacity utilization in cases where this is desired. A vehicle wherein the second wheel pair is provided non driven, can thus afterwards be completed with drive arrangement for the upgrading of the vehicle if requirements for increased capacity and driving effect should occur.

Preferably the steering of the second wheel pair is formed as any one from the group: hydraulic slave control being regulated by an angle between the portions of the vehicle during turning; a mechanical control, wherein a link system detects an angling of the steering joint and transmits a rotational movement to the respective wheel of the second wheel pair; an electric control, wherein an angle detector in the steering joint is arranged to send signals to control members which are arranged to provide output signals to rotational actuators for the wheels.

The invention also concerns a system for driving in respect of an articulated steering load-carrying vehicle according to the above which has a controllable joint with a second wheel pair being arranged in a rear portion of the articulated steering load-carrying vehicle, wherein the system includes electric motor means for electric motor driving of the second wheel pair.

The system is preferably comprised of an auxiliary module for a conventionally constructed articulated steering load-carrying vehicle having two wheel pairs.

The system preferably includes a second power engine for power supply of said electric motor means over an electric generator.

BRIEF DESCRIPTION OF DRAWINGS

The invention will now be described in more detail by way of embodiments with reference to the annexed drawings, wherein.

DETAILED DESCRIPTION OF THE PREFERRED EMBODIMENT

Figure 1:
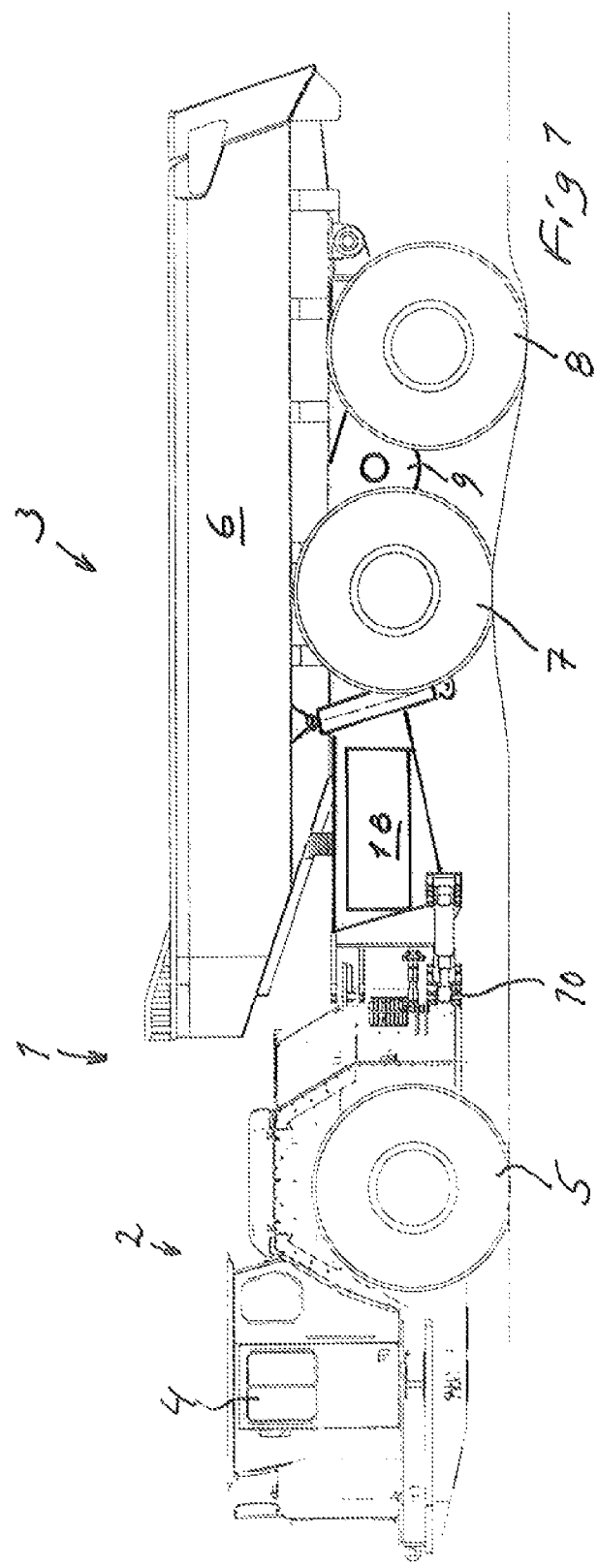
FIG. 1 shows, in a side view, an articulated steering load-carrying vehicle according to the invention.

In FIG. 1 is shown an articulated steering load-carrying vehicle 1 according to the invention which includes a front portion 2 with a driver's cabin 4 and a rear portion 3 with a load receiving device in the form of a tipping dump platform 6. The front portion 2 is pivotally connected in a per se known manner with the rear portion 3 over a steering joint 10.

The front portion 2 comprises a forward driving wheel pair whereof one wheel is indicated with 5 and the rear portion 3 comprises a bogie arrangement with two wheel pairs mutually interconnect over a pendulum suspension device, whereof a swing arm is indicated with 9, 9'. The swing arm carries a first driven wheel pair being positioned closest to the front of the vehicle whereof one wheel is indicated with 7 and a second driven wheel pair with the greatest distance from the front of the vehicle whereof one wheel is indicated with 8.

The load-carrying vehicle 1 is particularly adapted to carry great loads in an environment below ground, such as in respect of mining, tunnelling etc., and is through its construction flexibly drivable also in narrow passages in tunnels and galleries.

Figure 2:
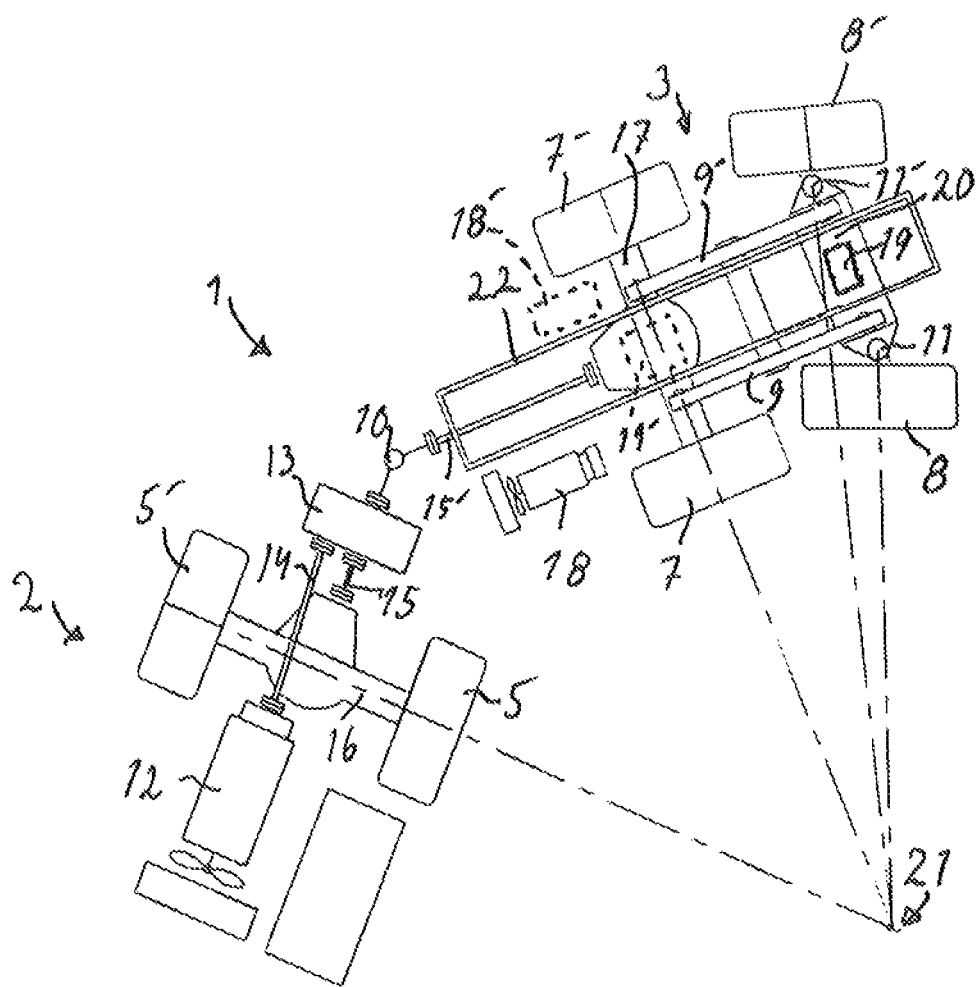
FIG. 2 shows in a diagrammatic plain view, the drive arrangements of the articulated steering load-carrying vehicle in FIG. 1 during turning.

In FIG. 2 are shown components that are important for the driving of the load-carrying vehicle, wherein, belonging to the front portion 2, is shown first power engine 12, which over a transmission 13 and drive shafts 14, 15 and 15' is arranged to mechanically over a drive shaft 15 drive a front wheel shaft 16, which carries the front wheel pair 5, 5', and drive a first wheel shaft 17 of the rear portion over a drive shaft 15', wherein the first wheel shaft 17 carries the first wheel pair 7, 7'. A frame of the rear portion is indicated with 22.

Further, the load-carrying vehicle according to the invention comprises, arranged on a second wheel shaft 20 a second wheel pair 8, 8', which on one hand is driveable by means of a second power engine 18 which, by a generator, provides power supply to an electric motor means 19, and on the other hand further in regard of steering for turning of the vehicle being steeringly connected to the rear portion 3 over power driven rotation joints 11 and 11'.

Steering of the second wheel pair can be accomplished in different ways, for example hydraulically, as a hydraulic slave control being regulated by the angle between the vehicle portions during turning. Alternatively the steering is actuated mechanically, wherein a not shown link system detects the angling of the steering joint 10 and transmits a rotational movement to the respective wheel of the second wheel pair.

In another embodiment the wheels of the second wheel pair 8, 8' are controlled electrically, wherein an angle detector in the steering joint 10 send signals to not shown control means, which are arranged to provide output signals to not shown rotator means arranged in the area of the rotation joints 11 and 11' in order to articulate the respective wheel 8, 8' in the second wheel pair to a desired rotation position such that the extension of the axes for all wheels are directed to one and the same point, the turning centre of the vehicle, detail 21 in FIG. 2.

The invention can be modified within the scope of the following claims. Also the first driven wheel pair 7, 7' can thus be driven through a further power engine 18', which by a further generator, provides power supply to an additional electric motor means 19' for driving this first wheel pair. The existence of such a drive arrangement or any other drive arrangement positioned in the rear portion of course eliminates transmission arrangements, which provides the driving of the first wheel pair 7, 7' from the first power engine 12.

The vehicle can also be made without the bogie construction being shown on the Figures and it is not excluded that the front portion has more than one wheel shaft and the rear portion more than two wheel shafts, in which cases further wheel shafts also can be steered as well as be driven.

Also the wheels of the first driven wheel pair 7, 7' could be steerable, wherein for example further narrower cornering could be achieved.

Powering of the vehicle can as an alternative to combustion engine operation through the first power engine and the second power engine be entirely electric through for example "trolley operation" with current collector for example in the tunnel roof.

The invention brings about many advantages, in particular for load-carrying vehicles which are used in mines, tunnels and the like. Because of the high axle load pressures that can occur for such vehicles, as is indicated above, a device according to WO 2009/108089 A1 would function less advantageously, in particular if there are requirements for flexible driving in narrow places.

With the steerability of the second driven wheel shaft which is provided through the present invention, the components can be used in a very efficient manner, wherein increased dimensions of components such as wheels and engines can be avoided.

EXAMPLE

In an example of an articulated steering load-carrying vehicle according to the invention, and in general according to FIGS. 1 and 2 there is arranged a first power engine delivering 760 hp and a second power engine delivering 275 hp. According to this example, the loading capacity can be increased from about 60 tons for an imagined twin shaft articulated steering load-carrying vehicle in general without the second wheel pair according to the invention, to about 85 tons for an articulated steering three shaft load-carrying vehicle according to the invention. The twin shaft vehicle is then equipped with the same (first) power engine delivering 760 hp and driveline for driving of the two shafts. Another manner of expressing this is to state that the drive effect for the vehicle with theses measures can be increased with about 30%.

Both vehicles have the same cross dimensions and can operate in passages (also narrow ones) with corresponding cross dimensions.

Further advantages with the modularity are that it can allow a speed increase and a high degree of adaptation to different needs, load volumes and user requirements. It shall also be mentioned that the braking ability of a vehicle according to the invention is enhanced compared to conventional load-carrying vehicles. Hereby the electric motor can be used as braking generator and the produced energy be cooled away with for example water or air.

The invention claimed is:

1. An articulated steering load-carrying vehicle (1) with a front portion (2), which is connected to a rear portion (3) via a steering joint (10), wherein the front portion (2) includes a first power engine (12) and at least one forward driven wheel pair (5,5') arranged on a front wheel shaft (16), and wherein the rear portion (3) includes a load receiving device (6) and at least two driven wheel pairs (7, 7'; 8, 8') including a first wheel pair (7, 7') arranged on a first wheel shaft (17) and a second wheel pair (8, 8') arranged on a second wheel shaft (20), wherein:
the second wheel pair (8, 8') is steeringly connected to the rear portion (3),
the second wheel pair (8, 8') is driven by electric motor means (19),
a second power engine (18) is arranged to supply power to said electric motor means (19) by an electric generator, and the second power engine (18) and the electric generator are arranged in the rear portion (3).

2. The articulated steering load carrying vehicle according to claim 1, wherein the first wheel pair (7, 7') is driven by additional electric motor means (19').

3. The articulated steering load carrying vehicle according to claim 2, wherein an additional power engine (18') is arranged to supply power to said additional electric motor means (19') by an additional electric generator.

4. The articulated steering load carrying vehicle according to claim 3, wherein said additional power engine (18') and said additional electric generator are arranged in the rear portion (3).

5. A system for driving of an articulated steering load-carrying vehicle according to claim 4, said system comprising:
an auxiliary module adapted to drive the second wheel pair (8, 8').

6. The articulated steering load-carrying vehicle according to claim 3, wherein steering of the second wheel pair (8, 8') is accomplished by one from the group:
hydraulic slave control being regulated by an angle between the front and rear portions (2, 3) of the vehicle during turning; a mechanical control, wherein a link system detects an angling of the steering joint (10) and transmits a rotational movement to a respective wheel of the second wheel pair (8, 8'); an electric control, wherein an angle detector in the steering joint (10) is arranged to send signals to control members which are arranged to provide output signals to rotational actuators for the second wheel pair (8, 8').

7. A system for driving of an articulated steering load-carrying vehicle according to claim 3, said system comprising:
an auxiliary module adapted to drive the second wheel pair (8, 8').

8. The articulated steering load carrying vehicle according to claim 2, wherein the front wheel shaft (16) is a rigid wheel shaft.

9. The articulated steering load carrying vehicle according to claim 2, wherein the first wheel shaft (17) is a rigid wheel shaft.

10. The articulated steering load-carrying vehicle according to claim 2, wherein the first wheel shaft (17) is interconnected with the second wheel shaft (20) by a pendulum suspension device (9, 9').

11. The articulated steering load-carrying vehicle according to claim 2, wherein steering of the second wheel pair (8, 8') is accomplished by one from the group:
hydraulic slave control being regulated by an angle between the front and rear portions (2, 3) of the vehicle during turning; a mechanical control, wherein a link system detects an angling of the steering joint (10) and transmits a rotational movement to a respective wheel of the second wheel pair (8, 8'); an electric control, wherein an angle detector in the steering joint (10) is arranged to send signals to control members which are arranged to provide output signals to rotational actuators for the second wheel pair (8 8').

12. A The system for driving of an articulated steering load-carrying vehicle according to claim 2, said system comprising:
an auxiliary module adapted to drive the second wheel pair (8, 8').

13. The articulated steering load carrying vehicle according to claim 1, wherein the first power engine (12), by a first drive shaft (14) and a transmission (13), is arranged to mechanically drive the front wheel shaft (16), which carries the first wheel pair (5, 5'), by a second drive shaft (15).

14. The articulated steering load carrying vehicle according to claim 13, wherein the first power engine (12), by said first drive shaft (14) and the transmission (13), is arranged to mechanically drive said first wheel shaft (17) in the rear portion (3) over a third drive shaft (15'), whereby the first wheel shaft (17) carries the first wheel pair (7, 7').

15. The articulated steering load carrying vehicle according to claim 1, wherein the front wheel shaft (16) is a rigid wheel shaft.

16. The articulated steering load carrying vehicle according to claim 1, wherein the first wheel shaft (17) is a rigid wheel shaft.

17. The articulated steering load carrying vehicle according to claim 1, wherein the first wheel shaft (17) is interconnected with the second wheel shaft (20) by a pendulum suspension device (9, 9').

18. The articulated steering load-carrying vehicle according to claim 1, wherein steering of the second wheel pair (8, 8') is accomplished by one from the group:
hydraulic slave control being regulated by an angle between the front and rear portions (2, 3) of the vehicle during turning; a mechanical control, wherein a link system detects an angling of the steering joint (10) and transmits a rotational movement to a respective wheel of the second wheel pair (8, 8'); an electric control, wherein an angle detector in the steering joint (10) is arranged to send signals to control members which are arranged to provide output signals to rotational actuators for the second wheel pair (8, 8').

19. A system for driving of an articulated steering load-carrying vehicle according to claim 1, said system comprising:
an auxiliary module adapted to drive the second wheel pair (8, 8').

* * * * *